US009284128B2

(12) United States Patent
Stegmiller

(10) Patent No.: US 9,284,128 B2
(45) Date of Patent: Mar. 15, 2016

(54) BALL TRANSFER UNIT SUPPORT SYSTEMS

(71) Applicant: Goodrich Corporation, Charlotte, NC (US)

(72) Inventor: Wesley K. Stegmiller, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 42 days.

(21) Appl. No.: 14/262,017

(22) Filed: Apr. 25, 2014

(65) Prior Publication Data

US 2015/0307284 A1 Oct. 29, 2015

(51) Int. Cl.
*B65G 39/12* (2006.01)
*B65G 39/02* (2006.01)
*F16C 29/04* (2006.01)
*B65G 13/00* (2006.01)

(52) U.S. Cl.
CPC ................ *B65G 39/12* (2013.01); *B65G 13/00* (2013.01); *B65G 39/025* (2013.01); *F16C 29/046* (2013.01)

(58) Field of Classification Search
CPC ...... B65G 13/00; B65G 13/12; B65G 39/025; B65G 39/12; B65G 2207/34; F16C 29/046
USPC .................................................... 193/35 MD
See application file for complete search history.

(56) References Cited

U.S. PATENT DOCUMENTS 4,013,282 A 3/1977 Kaufmann et al.
4,696,583 A * 9/1987 Gorges .................... B60B 33/08 16/26
5,464,086 A 11/1995 Coelln
5,533,604 A * 7/1996 Brierton ............... B65G 39/025 193/35 MD
6,120,185 A * 9/2000 Masciarelli, Jr. ...... B65G 13/12 193/35 MD
6,125,984 A * 10/2000 Huber ....................... B64C 1/20 193/35 MD
6,129,195 A 10/2000 Matheny
6,814,212 B1 11/2004 Ebersole
6,883,965 B2 * 4/2005 Gasal ....................... B60B 33/08 193/35 MD
6,991,082 B2 * 1/2006 Olson ...................... B64D 9/00 193/35 MD
2003/0103698 A1 6/2003 Gasal et al.
2005/0126879 A1 6/2005 Olson et al.

FOREIGN PATENT DOCUMENTS

DE 8713183 12/1987
DE 20015059 1/2002
EP 0162484 11/1985
EP 0329816 8/1989
EP 0513562 11/1992
EP 1316518 6/2003

OTHER PUBLICATIONS

Extended European Search Report dated Sep. 7, 2015 in European Application No. 15164378.0.

* cited by examiner

*Primary Examiner* — Gene Crawford
*Assistant Examiner* — Keith R Campbell
(74) *Attorney, Agent, or Firm* — Snell & Wilmer, LLP

(57) ABSTRACT

A ball transfer unit support may include a top ring, an upper portion adjacent to the top ring, a lower portion, and a shoulder located between the upper portion and the lower portion. The shoulder may be configured to support a ball transfer unit. The top ring may be in the shape of a truncated circle, and the top ring may snap into an aperture in a top skin of a ball panel. The top ring may include a retaining lip which snaps below the top skin. The truncated circle shape of the top ring may provide anti-rotation between the ball transfer unit support and the ball panel. The ball transfer unit support may transfer load on the ball transfer unit to a bottom skin of the ball panel.

15 Claims, 6 Drawing Sheets

BALL TRANSFER UNIT SUPPORT SYSTEMS

FIELD

The present disclosure relates generally to support systems. More particularly, the present disclosure relates to ball transfer units.

BACKGROUND

Ball transfer units provide low friction surfaces for transporting items. A plurality of ball transfer units may be inserted in a mounting structure (sometimes referred to as a ball panel or ball mat) in a cargo deck of an aircraft, which may allow for cargo to be easily slid over the deck in any direction. Repeated loading on the ball transfer units may cause damage to the ball transfer units or the ball panel.

SUMMARY

A ball transfer unit support is disclosed. The ball transfer unit support may comprise a top ring, an upper portion adjacent to the top ring, a lower portion, and a shoulder between the upper portion and the lower portion.

In various embodiments, the ball transfer unit support may comprise a truncated circle. The shoulder may be configured to support a ball transfer unit. A diameter of the upper portion may be greater than a diameter of the lower portion. The top ring may comprise a retaining lip. The retaining lip may be configured to contact a bottom surface of a top skin of a ball panel. The ball transfer unit support may comprise a ball transfer unit located within the ball transfer unit support. The top ring may be configured to prevent rotation of the ball transfer unit support.

A ball transfer unit system is disclosed. The ball transfer unit system may comprise a ball panel, a ball transfer unit support, and a ball transfer unit. The ball panel may comprise an aperture. The ball transfer unit support may be located within the aperture. The ball transfer unit support may comprise a shoulder. The ball transfer unit may be located within the ball transfer unit support. A tapered neck of the ball transfer unit may be supported by the shoulder of the ball transfer unit support.

In various embodiments, the ball panel may comprise a top skin, a bottom skin, and a corrugation. The ball transfer unit support may be configured to transfer load from the ball transfer unit to a bottom section of the corrugation. The aperture may comprise a truncated circle. The ball transfer unit support may comprise a top ring including a retaining lip. The retaining lip may be configured to snap into the aperture. A clearance between a ball in the ball transfer unit and the top skin may be greater than 0.25 inches (0.64 cm). The ball transfer unit may comprise a top ring comprising a truncated circle. The aperture and a top ring of the ball transfer unit support may comprise an anti-rotation feature.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Systems and methods are disclosed herein for a ball transfer unit support. The support may be inserted in a ball panel having a top skin and a bottom skin. A standard ball transfer unit ("BTU") may be inserted into the BTU support. The BTU may be supported by a shoulder portion of the BTU support. The BTU support may distribute vertical load from the BTU onto the bottom skin. The BTU support may snap into the top skin. Truncated sides of the BTU support may prevent the BTU support from rotating.

Figure 1:
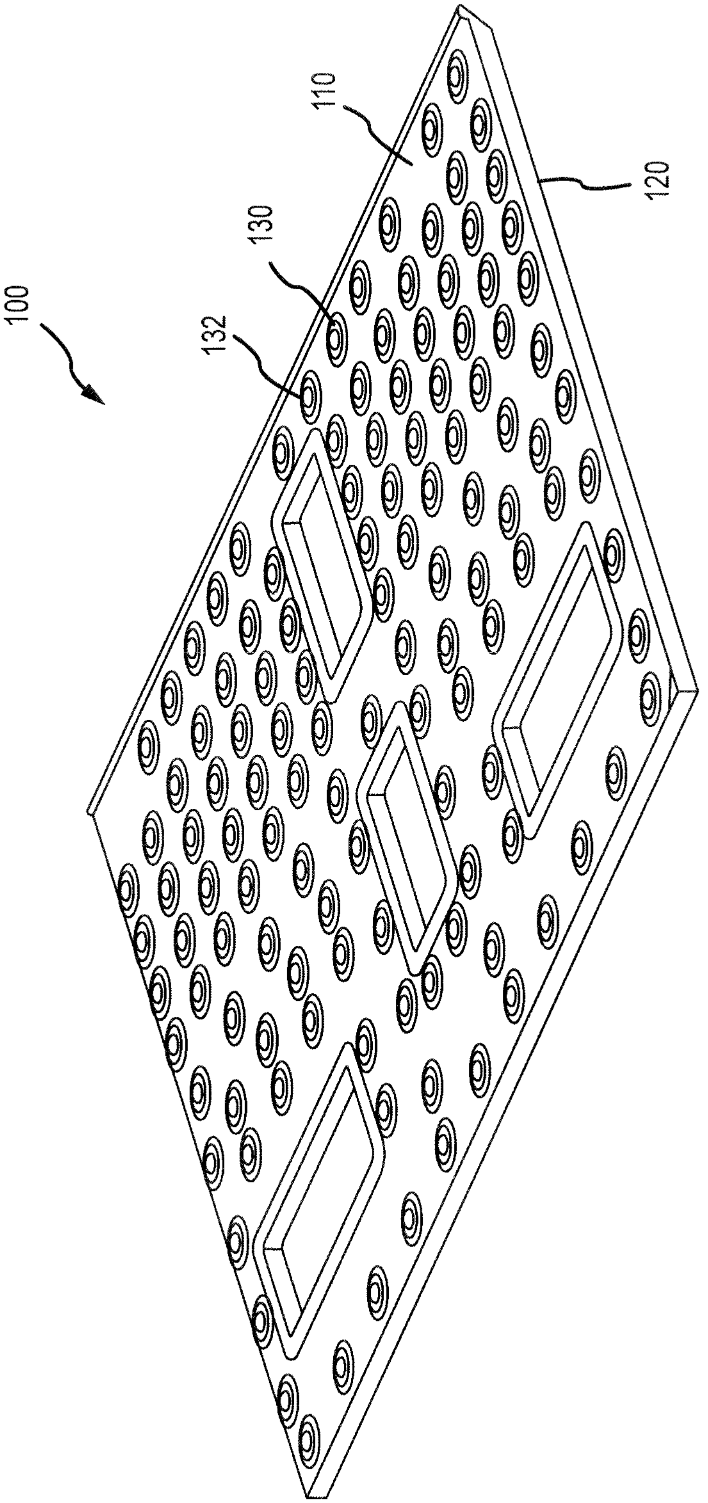
FIG. 1 illustrates a ball panel, in accordance with various embodiments.

Referring to FIG. 1, a BTU ball panel 100 is illustrated according to various embodiments. BTU ball panel 100 may comprise a top skin 110, a bottom skin 120, and a plurality of BTUs 130. The BTUs 130 may snap into holes in the top skin 110 of BTU ball panel 100. In various embodiments, BTU ball panel 100 may be configured to be used as decking for a cargo deck in an aircraft. Cargo may be slid across BTU ball panel 100, and balls 132 in the BTUs 130 may rotate, providing a low friction surface for cargo to be moved.

Figure 2A:
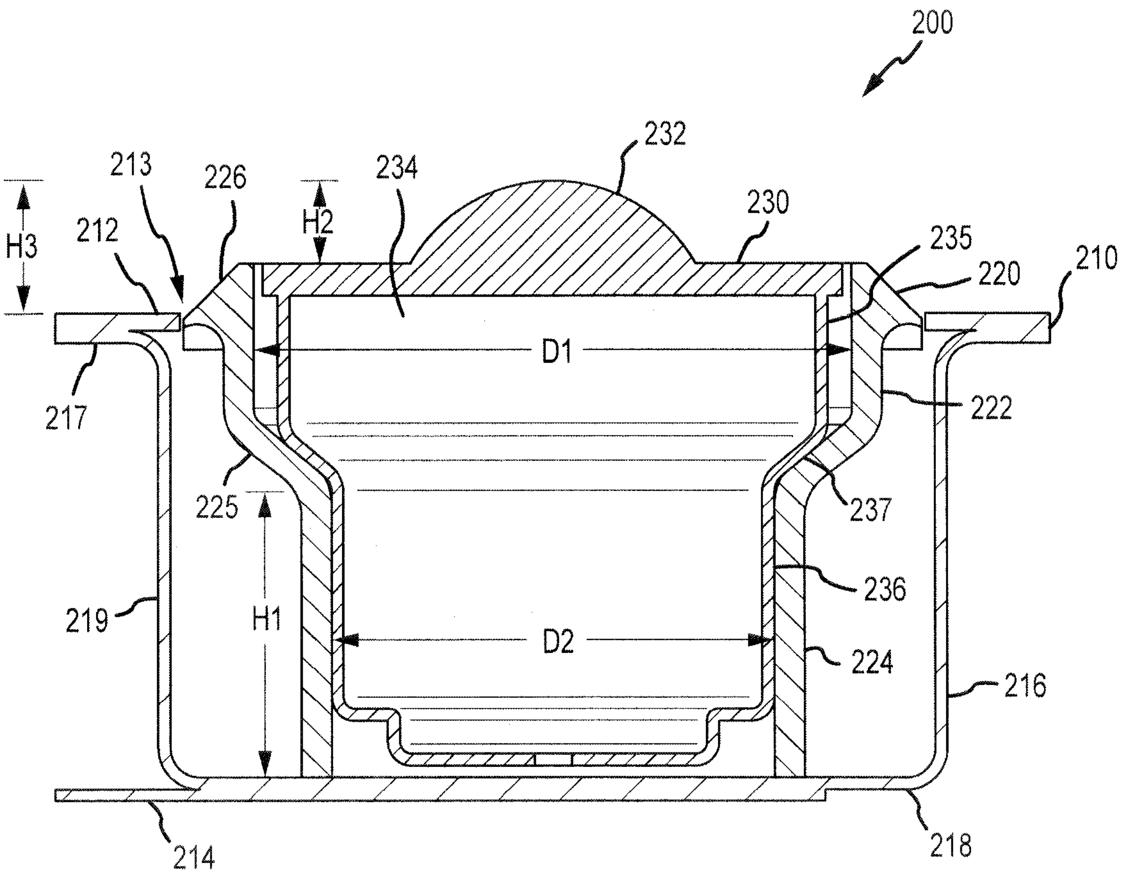
FIG. 2A illustrates a cross-section of a BTU system, in accordance with various embodiments.

Referring to FIG. 2A, a cross-section of a BTU system 200 is illustrated according to various embodiments. BTU system 200 may comprise a ball panel 210, a BTU support 220, and a BTU 230. In various embodiments, BTU 230 may comprise a standard BTU, such as a model J-082269-6 "dash 6" BTU. BTU 230 may comprise a ball 232 supported by a ring of ball bearings which allow ball 232 to rotate with low friction. Ball 232 and the ball bearings may be housed within a canister 234. Canister 234 may comprise an upper portion 235, and a lower portion 236. A diameter of upper portion 235 may be greater than a diameter of lower portion 236. Canister 234 may comprise a tapered neck 237 between upper portion 235 and lower portion 236.

BTU 230 may be seated within BTU support 220. BTU support 220 may be generally cylindrical. BTU support 220 may comprise an upper portion 222 having a diameter D1 and a lower portion 224 having a diameter D2. In various embodiments, diameter D1 may be about 1.81 inches (4.60 cm), such as between 1.70 inches-1.90 inches (4.32 cm-4.83 cm), and diameter D2 may be about 1.35 inches (3.43 cm), such as between 1.25 inches-1.45 inches (3.18 cm-3.68 cm). BTU support 220 may comprise a shoulder 225 between upper portion 222 and lower portion 224. Shoulder 225 may be configured to support tapered neck 237 of BTU 230. Thus, vertical load on BTU 230 may be transferred from BTU 230 to BTU support 220 at the interface between tapered neck 237 and shoulder 225. A height H1 of lower portion 224 of BTU support 220 may be adjusted in order to adjust a height H3 of ball 232 above top skin 212. In various embodiments, height H1 may be about 0.912 inches (2.32 cm), such as between 0.80 inches-1.00 inches (2.03 cm-2.54 cm). In various embodiments, height H3 may be greater than 0.25 inches (0.64 cm), such as about 0.40 inches (1.0 cm), or between 0.30 inches-0.50 inches (0.76 cm-1.3 cm). A height H2 of ball 232 above the top of canister 234 may be about 0.25 inches (0.64 cm), such as between 0.20 inches-0.30 inches (0.51 cm-0376 cm). Thus, BTU support 220 may allow ball 232 to protrude further above top skin 212 than the top of canister 234. BTU support 220 may further comprise a top ring 226 adjacent to upper portion 222. Top ring 226 may be configured to snap into top skin 212 of ball panel 210, as further described with reference to FIG. 3. In various embodiments, BTU support 220 may comprise a polymeric material, such as ULTEM, which is a glass filled polyetherimide sold by SABIC.

Ball panel 210 may comprise top skin 212, bottom skin 214, and corrugation 216. In various embodiments, top skin 212, bottom skin, 214, and/or corrugation 216 may comprise aluminum sheet metal. Corrugation 216 may comprise alternating top sections 217 and bottom sections 218 adjoined by vertical sections 219. Corrugation 216 may provide vertical strength to ball panel 210. Top skin 212 may comprise apertures 213 configured to accept BTU support 220. Lower portion 224 of BTU support 220 may contact bottom section 218 of corrugation 216, and may transfer the vertical load from BTU 230 to ball panel 210.

Figure 2B:
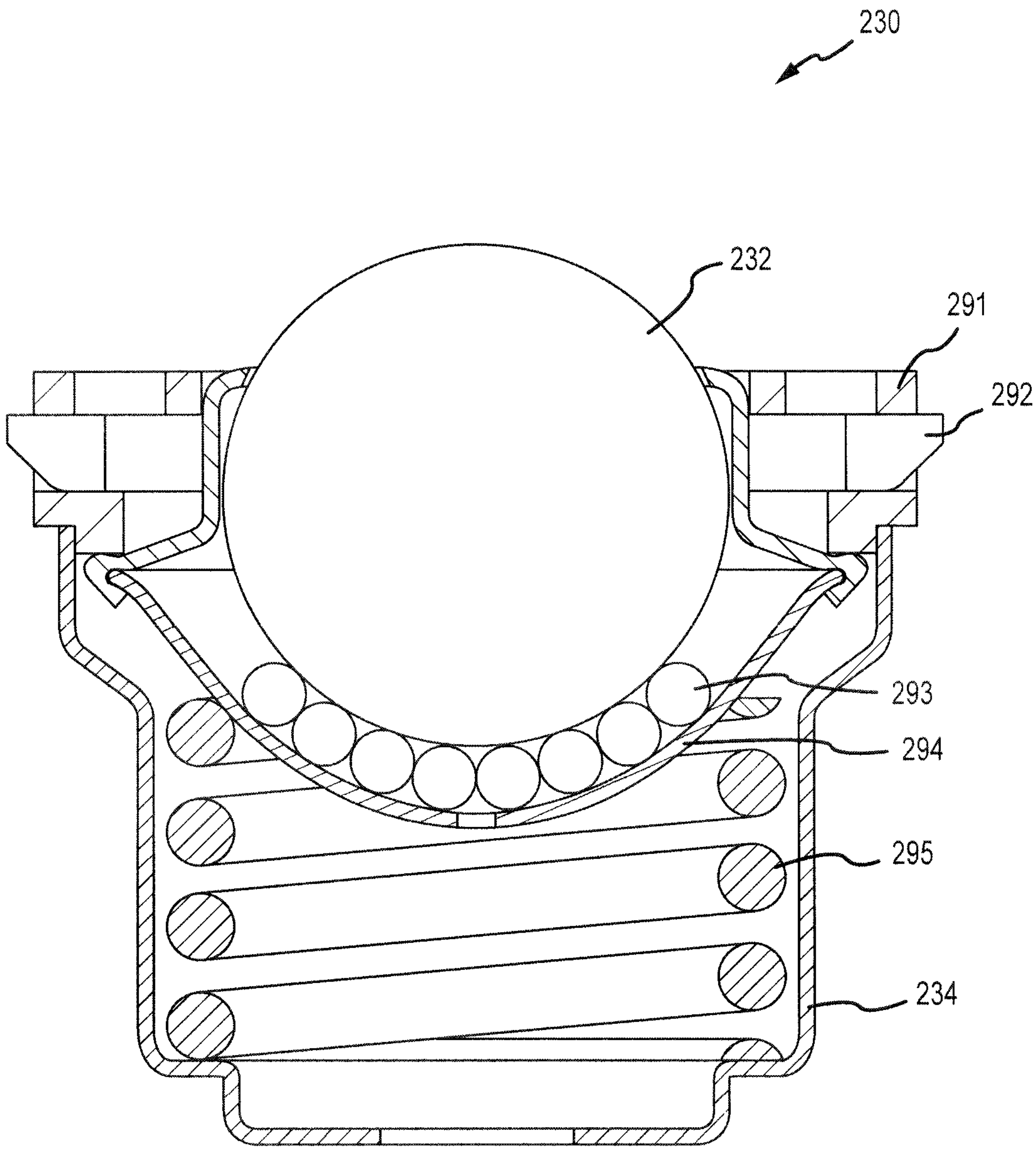
FIG. 2B illustrates a cross-section of a BTU in accordance with various embodiments.

Referring to FIG. 2B, a cross-section of BTU 230 is illustrated according to various embodiments. BTU 230 may comprise a canister 234. A compression spring 295 may be located within canister 234. Compression spring 295 may support ball bearing race 294 and ball bearings 293. Ball 232 may contact ball bearings 293, and ball 232 may be configured to rotate relative to ball bearings 293. A retention pin 292 may retain BTU 230 within a ball panel, and a top cover 291 may enclose canister 234. Ball 232 may protrude above top cover 291.

Figure 3:
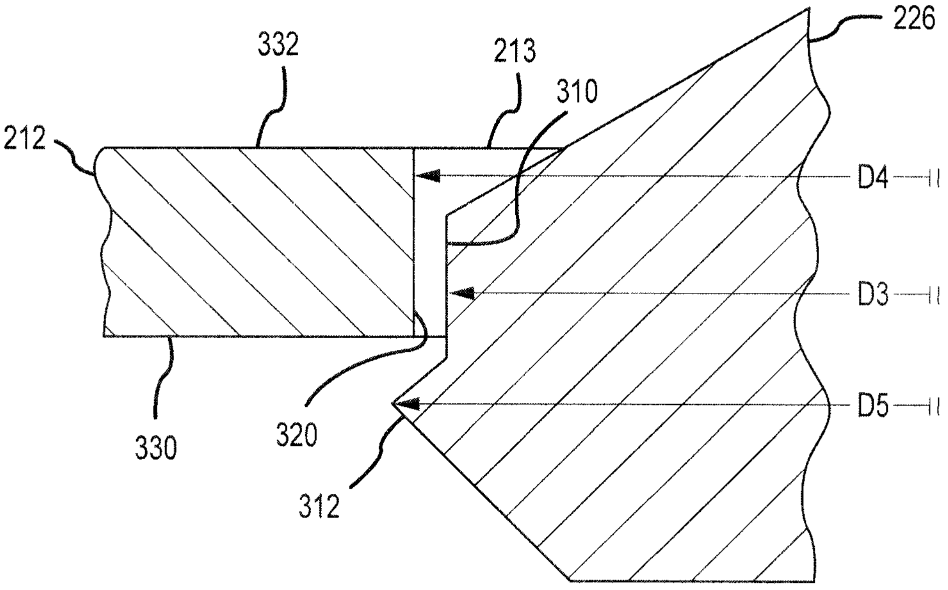
FIG. 3 illustrates a top ring and a top skin, in accordance with various embodiments.

Referring to FIG. 3, a close-up view of top ring 226 and top skin 212 is illustrated according to various embodiments. Top ring 226 may be inserted within aperture 213 in top skin 212. Top ring 226 may comprise a vertical wall 310 and a retaining lip 312. In various embodiments, a diameter D3 of top ring 226 at vertical wall 310 may be less than a diameter D4 of aperture 213, and a diameter D5 of top ring 226 at retaining lip 312 may be greater than a diameter D4 of aperture 213. Thus, contact between vertical wall 310 and an inner surface 320 of aperture 213 may prevent lateral movement of top ring 226 within aperture 213. Additionally, contact between retaining lip 312 and a bottom surface 330 of top skin 212 may prevent vertical movement of top ring 226. In various embodiments, top ring 226 does not contact top surface 332 of top skin 212. Thus, top skin 212 may not support the load on BTU 230.

In various embodiments, a compliance of BTU support 220 allows BTU support 220 to be inserted through aperture 213. As BTU support 220 is inserted through aperture 213, retaining lip 312 may contact inner surface 320 of aperture 213. Top ring 226 may compress until retaining lip 312 is pushed below bottom surface 330 of top skin 212, at which point top ring 226 may decompress and retaining lip 312 may lock into place below top skin 212.

Figure 4:
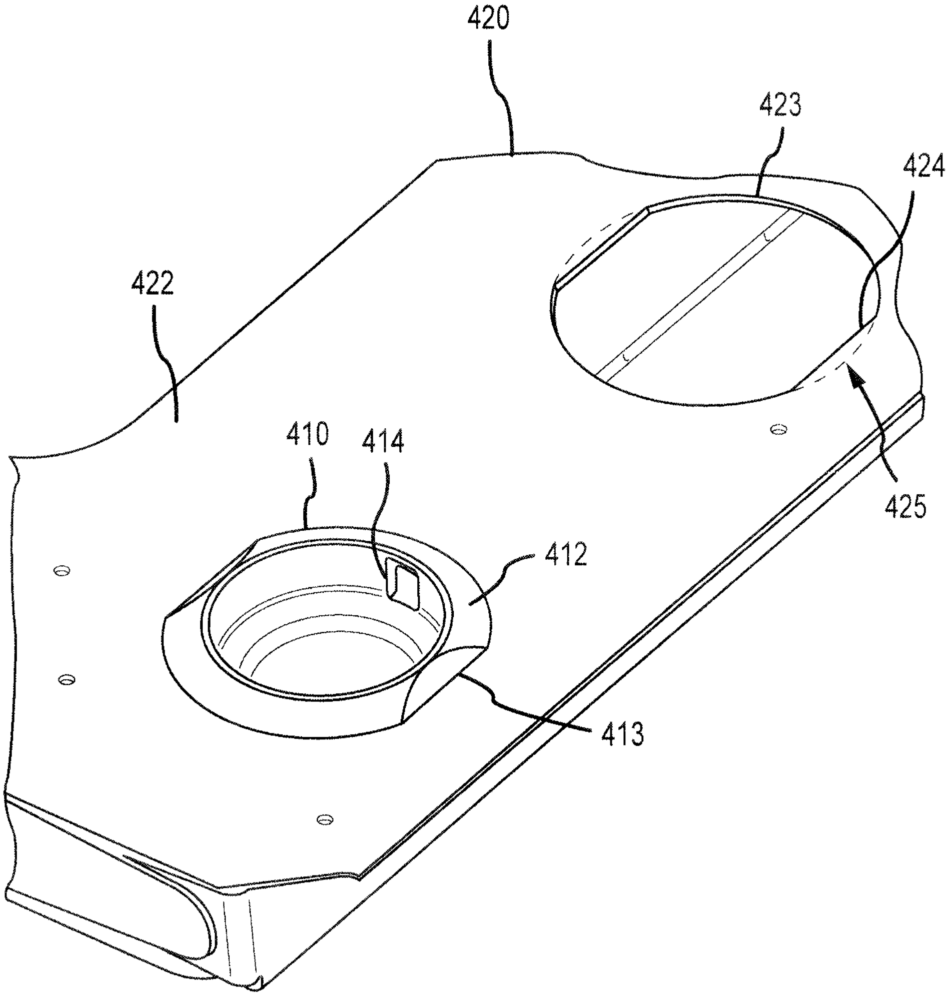
FIG. 4 illustrates a perspective view of a BTU support in a ball panel, in accordance with various embodiments.

Referring to FIG. 4, a perspective view of a BTU support 410 in a ball panel 420 is illustrated according to various embodiments. Top skin 422 of ball panel 420 may comprise apertures 423. Apertures 423 may be generally circular holes with truncated sides 424 in top skin 422. As used herein, a circle with truncated sides refers to a circle excluding opposing segments, such as opposing segments 425 indicated by dashed lines. Similarly, top ring 412 of BTU support 410 may be generally circular with truncated sides 413. Contact between the truncated sides 413 of top ring 412 and the truncated sides 424 of apertures 423 may prevent BTU support 410 from rotating within apertures 423. BTU support 410 may further comprise a keyhole 414. Keyhole 414 may be configured to receive a locking pin on a BTU in order to prevent BTU from popping out of BTU support 410.

Figure 5:
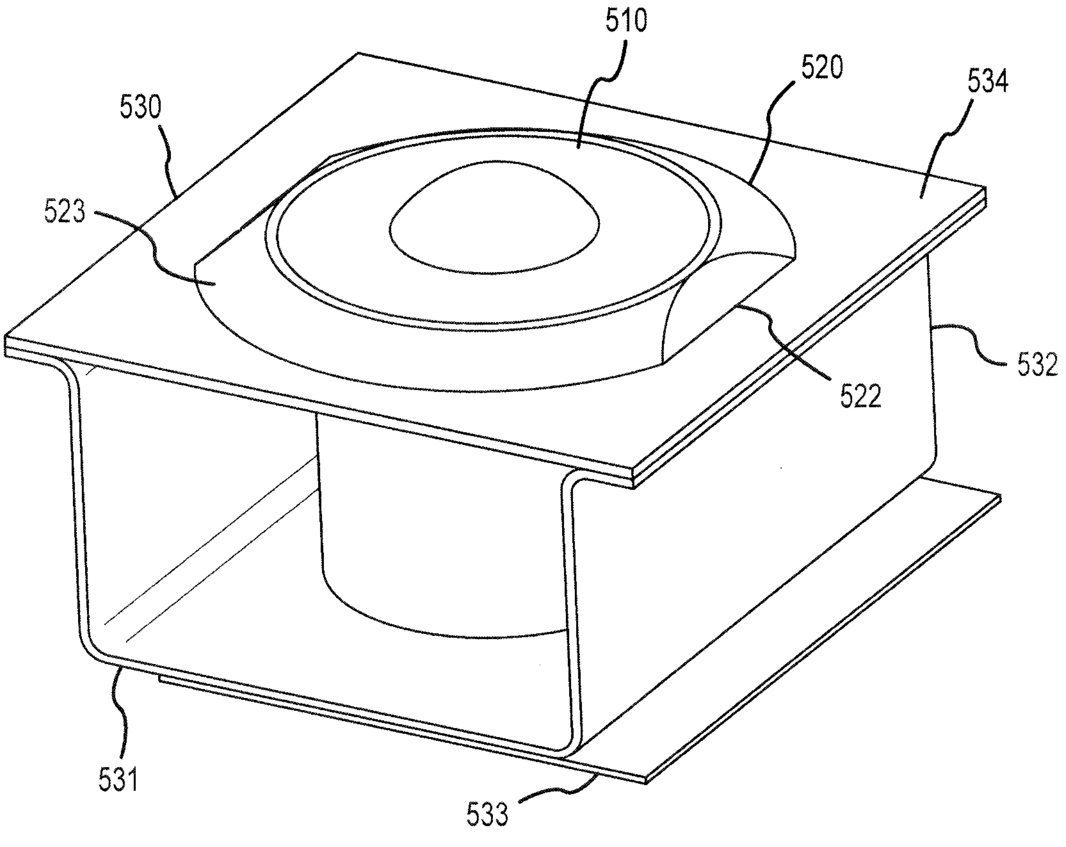
FIG. 5 illustrates a perspective view of a BTU support and a BTU in a ball panel, in accordance with various embodiments.

Referring to FIG. 5, a perspective view of a BTU 510, a BTU support 520, and a ball panel 530 is illustrated according to various embodiments. As illustrated, a load placed on BTU 510 will be transferred through BTU support 520 to bottom section 531 of corrugation 532 and to bottom skin 533. Thus, top skin 534 may not experience large loads from BTU 510, and top skin 534 may be subject to less stress and deformation in comparison to designs, wherein top skin 534 supports the load on BTU 510. Furthermore, as truncated sides 522 of top ring 523 prevent rotation of BTU support 520, anti-rotation features may be omitted from bottom section 531 of corrugation 532, and bottom section 531 may comprise a continuous sheet of material without anti-rotation features therein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A ball transfer unit support comprising:

a top ring;

an upper portion adjacent to the top ring;

a lower portion; and a shoulder between the upper portion and the lower portion, wherein the shoulder is configured to support a tapered neck of a canister of a ball transfer unit.

2. The ball transfer unit support of claim 1, wherein the top ring comprises a truncated circle.

3. The ball transfer unit support of claim 1, wherein the shoulder is configured to support a J-082269-6 ball transfer unit.

4. The ball transfer unit support of claim 1, wherein a diameter of the upper portion is greater than a diameter of the lower portion.

5. The ball transfer unit support of claim 1, wherein the top ring comprises a retaining lip.

6. The ball transfer unit support of claim 5, wherein the retaining lip is configured to contact a bottom surface of a top skin of a ball panel.

7. The ball transfer unit support of claim 1, further comprising a ball transfer unit located within the ball transfer unit support.

8. The ball transfer unit support of claim 1, wherein the top ring is configured to prevent rotation of the ball transfer unit support.

9. A ball transfer unit system comprising:

a ball panel comprising an aperture;

a ball transfer unit support located within the aperture, wherein the ball transfer unit support comprises a shoulder; and a ball transfer unit located within the ball transfer unit support, wherein a tapered neck of a canister of the ball transfer unit is supported by the shoulder of the ball transfer unit support.

10. The ball transfer unit system of claim 9, wherein the ball panel comprises a top skin, a bottom skin, and a corrugation, and wherein the ball transfer unit support is configured to transfer load from the ball transfer unit to a bottom section of the corrugation.

11. The ball transfer unit system of claim 9, wherein the aperture comprises a truncated circle.

12. The ball transfer unit system of claim 9, wherein the ball transfer unit support comprises a top ring including a retaining lip, and wherein the retaining lip is configured to snap into the aperture.

13. The ball transfer unit system of claim 9, wherein a clearance between a ball in the ball transfer unit and a top skin of the ball panel is greater than 0.25 inches (0.64 cm).

14. The ball transfer unit system of claim 9, wherein the ball transfer unit support comprises a top ring comprising a truncated circle.

15. The ball transfer unit system of claim 9, wherein the aperture and a top ring of the ball transfer unit support comprise an anti-rotation feature.

* * * * *